United States Patent [19]

Kraus et al.

[11] 4,340,475
[45] Jul. 20, 1982

[54] MEMBRANE SEPARATION CELL

[75] Inventors: Menahem A. Kraus, Rehovot; Avinoam Livni, Haifa; Mara Nemas, Neveh Monoson; Moshe A. Frommer, Rehovot, all of Israel

[73] Assignee: A.T. Ramot Plastics Ltd., Tel Aviv, Israel

[21] Appl. No.: 114,363

[22] Filed: Jan. 22, 1980

[51] Int. Cl.³ .............................................. B01D 31/00
[52] U.S. Cl. .................................... 210/232; 210/336; 210/433.2
[58] Field of Search ............ 210/23 H, 321 R, 321 A, 210/321 B, 343, 344, 456, 331, 336, 232, 433.2

[56] References Cited
U.S. PATENT DOCUMENTS

| | | | |
|---|---|---|---|
| 3,209,915 | 10/1965 | Gutkowski | 210/498 |
| 3,352,422 | 11/1967 | Heden | 210/321 B |
| 3,473,668 | 10/1969 | Bunyard et al. | 210/344 |
| 3,608,610 | 9/1971 | Greatorex | 210/321 A |
| 3,623,610 | 11/1971 | Olsen et al. | 210/336 X |
| 3,695,444 | 10/1972 | Iaconelli | 210/321 A |
| 3,809,248 | 5/1974 | Niogret | 210/321 R |
| 3,879,286 | 4/1975 | Berriman | 210/345 |
| 3,984,324 | 10/1976 | Wang | 210/321 R |
| 4,025,425 | 5/1977 | Croopnick et al. | 210/321 R |

Primary Examiner—Frank A. Spear, Jr.
Attorney, Agent, or Firm—Benjamin J. Barish

[57] ABSTRACT

A membrane separation cell is described comprising a stack of supporting members each supporting a membrane on each of its opposite faces and defining a permeate compartment therewith, and separating members interposed between the membranes of adjacent supporting members and defining feed solution compartments therewith. The separating members are plates formed with passageways connecting the feed solution compartments in series through the stack such that the feed solution flows through each feed solution compartment in an inward direction across one face of the separator plate and in an outward direction across its opposite face. The membrane supporting members are plates each formed with an outer rim having passageways for conducting the permeate from the permeate compartment in parallel out of the stack.

7 Claims, 6 Drawing Figures

MEMBRANE SEPARATION CELL

BACKGROUND OF THE INVENTION

The present invention relates to membrane separation cells for separating a permeate from a feed solution. The invention is particularly useful as a reverse-osmosis cell in an artificial kidney, especially the portable type, and therefore is described below with respect to such an application, but it will be appreciated that the invention could be used in many other applications, for example as reverse-osmosis cells or as ultrafiltration cells in water purification and desalination system for separating potable water from sea or saline water, and also in laboratory systems for separating various types of permeates from feed solutions.

In recent years, a number of portable types of artificial kidneys including reverse osmosis cells have been proposed for removing toxic substances from body fluids, see for example U.S. Pat. Nos. 3,579,441 and 3,799,873. The cells used in such artificial kidneys involve parallel flow of the feed solution through the membranes of the cell. However, portable artificial kidneys require high recovery (percentage of feed obtained as membrane permeate), and low energy drive pumps, and therefore provide an extremely low volume flow. Cells having parallel flow of the feed solution with low volume flow rates tend to produce strong polarization, and even stagnation. causing the overall efficiency of the artificial kidney to be substantially decreased.

An object of the present invention is to provide a membrane separation cell having a relatively high linear flow rate with a relatively low volume flow rate, which permits the use of small pumps and thereby makes the cell particularly useful in portable artificial kidneys.

Another object of the invention is to provide a membrane separation cell which is capable of being miniaturized so as to provide a relatively small volume and low weight, a relatively large membrane area, a relatively high recovery, and a relatively low energy consumption.

BRIEF SUMMARY OF THE INVENTION

According to a broad aspect of the present invention there is provided a membrane separation cell for separating a permeate from a feed solution, comprising: a stack including a plurality of members each supporting a membrane on each of its opposite faces and defining a permeate compartment between the membrane and the respective face of the supporting member; and a plurality of separating members each interposed between the membranes of adjacent supporting members and defining a feed solution compartment between the separating member and the respective membrane. The said separating members are plates formed with passageways therebetween connecting the feed solution compartments in series through the stack such that the feed solution flows through each feed solution compartment in an inward direction across one face of the separator plate and in an outward direction across the opposite face of the separator plate.

More particularly, the opposite faces of the separator plates are each formed with a thickened outer rim circumscribing a recessed area across which the feed solution flows as a thin layer in a radial direction in contact with the face of the adjacent membrane. The passageway through each separator plate includes a peripheral array of openings formed therethrough just inwardly of the thickened outer rim. Further, the recessed central area of each separator plate is formed with projections of ribs of smaller thickness than the thickness of the outer rim to impart a turbulence to the feed solution as it flows in a radial direction across the respective face of the separator plate.

BRIEF DESCRIPTION OF THE DRAWINGS

The invention is herein described by way of example only, with reference to the accompanying drawings, wherein.

DESCRIPTION OF PREFERRED EMBODIMENTS

Figure 1:
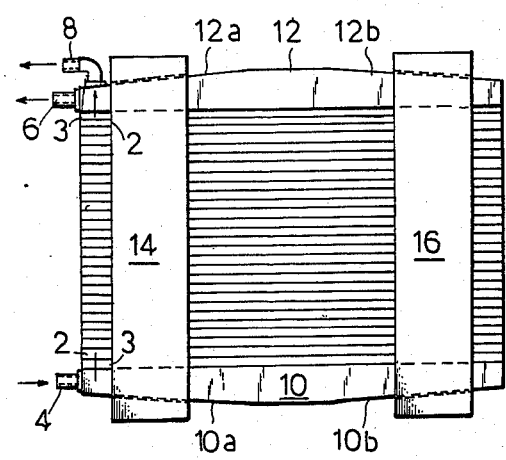
FIG. 1 is a side elevational view of one form of membrane separation cell, particularly a reverse osmosis cell, constructed in accordance with the invention.

The cell illustrated in FIG. 1 comprises a stack of membrane supporting plates, each generally designated 2 and described more particularly below with respect to FIG. 2, and a plurality of separator plates, each generally designated 3 and described below with respect to FIG. 3. Each membrane supporting plate 2 supports a pair of membranes in spaced relationship to each other, and each separator plate 3 is interposed between the membranes of adjacent membrane supporting plates. The assembled cell of FIG. 1 further includes a feed solution inlet 4 communicating with the separator plate 3 on the inlet side of the stack (this being the bottom-most separator plate in FIG. 1. ); a feed solution outlet 6 communicating with the separator plate 3 on the outlet side of the stack (this being the top-most separator plate in FIG. 1); and a permeate outlet 8 communicating with the spaces between the two membranes in each of the membrane supporting plates 2.

The assembled cell illustrated in FIG. 1 further includes a pair of cover plates 10 and 12 on the opposite sides (i.e., the bottom and top, respectively, in FIG. 1) of the stack. Each of the cover plates 10, 12 is of widest dimension in its central region, and tapers inwardly towards each end, as shown by tapered surfaces 10a, 10b of bottom plate 10, and tapered surfaces 12a, 12b of top plate 12. The cover plates 10, 12, together with the membrane supporting plates 2, the membranes supported thereby, and the separator plates 3 within the stack, are all firmly clamped together by a pair of clamping yokes 14, 16 enclosing the opposite sides of the cover plates and having inner surfaces tapered corresponding to the tapers 10a, 10b, 12a, 12b of these plates so that forcing the two clamping yokes 14, 16 towards each other (i.e., towards the central regions of the cover plates) causes the yokes to firmly press the plates, and the members between them, towards each other.

Figure 2:
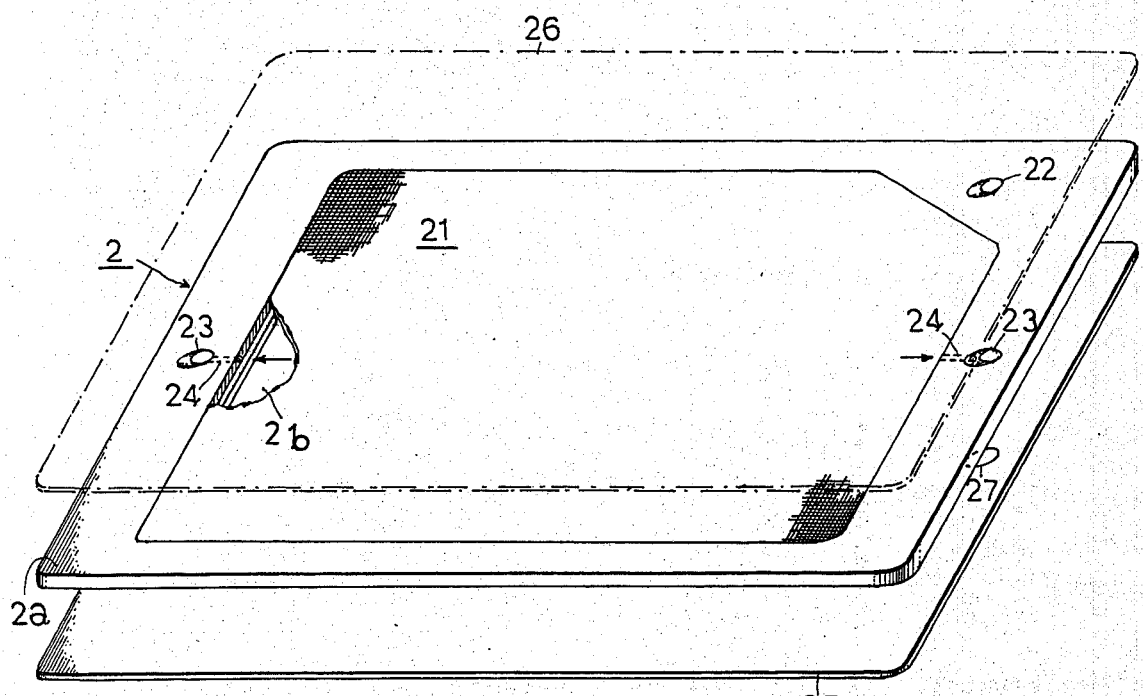
FIG. 2 is a three-dimensional view of one of the membrane supporting plates and the two membranes supported thereby in the cell of FIG. 1.

The structure of each of the membrane supporting plates 2, together with the membranes supported thereby, is best seen in FIG. 2. Each membrane supporting plate 2 is of rectangular configuration and includes an outer thickened rim 2a enclosing a central recessed area 2b covered on each face by a porous sheet in the form of a coarse screen 21, for example of stainless steel. Plate 2 is formed with a large opening 22 through its rim 2a at one side, and with a pair of further openings 23 through its rim on opposite sides, the latter openings communicating with ducts or channels 24 leading from recessed area 2b at the inner face of the rim. A pair of membranes 25, 26 are disposed on opposite sides of the membrane supporting plate 2 over the screens 21, each membrane including an opening (e.g. 27) aligned with openings 22, 23 through the rim 2a of the supporting plate.

It will be seen that a feed solution compartment is defined by each face of the separator plate 3 and the respective membrane (25, 26), and a permeate compartment is defined by each membrane and the central recessed area 2b of the respective support plate 2.

Large openings 22 in the membrane supporting plate 2 are in the feed solution (high pressure) path communicating with the feed solution compartments of all the membranes in the stack for conducting the feed solution serially from one feed solution compartment to the next; and channels 24 and openings 23 are in the permeate (low pressure) path communicating with the permeate compartments for conducting the permeate in parallel to the permeate outlet 8.

Figure 3:
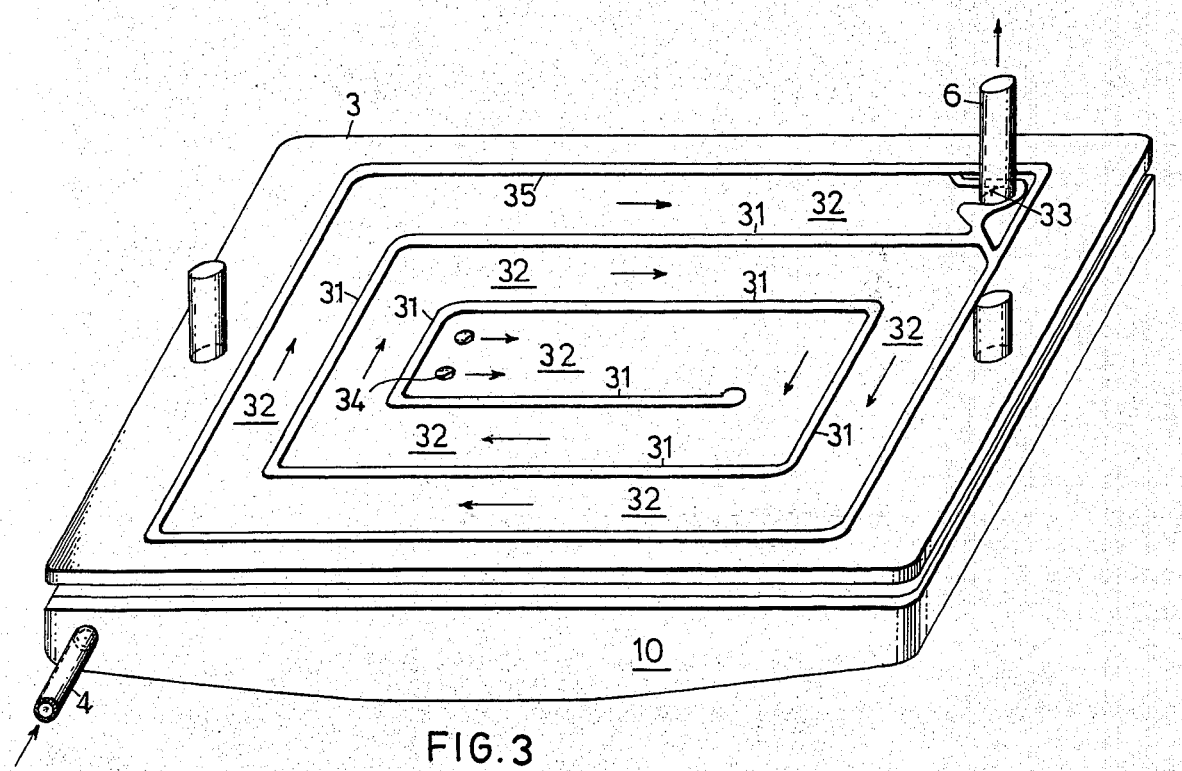
FIG. 3 is a three-dimensional view of a separator plate in the cell of FIG. 1.

The structure of each separator plate 3 in the stack is seen in FIG. 3. Briefly, it includes a first spiral path on one face for conducting the feed solution spirally in contact with the adjacent membrane on one side; a second spiral path on the opposite face for conducting the feed solution spirally in contact with the adjacent membrane on the opposite side; and a connecting passageway connecting together the two spiral paths on the opposite faces.

FIG. 3 illustrates only the spiral path on the upper face of the lowermost separator plate 3, i.e., the separator plate adjacent to the bottom cover plate 10. Each spiral path is defined by a rib 31 projecting from the respective (upper, FIG. 3) face of the separator plate and following a spiral configuration starting from the center region of the plate and progressing outwardly. Rib 31 thus provides a spiral path 32 starting from a pair of openings 34 at the central region of the plate, the path moving spirally around the plate in a clockwise direction and terminating at an opening 33 at the peripheral region (upper right corner, FIG. 3) of the plate. Openings 34 are formed through each plate 30 and constitute the connecting passageways connecting the illustrated spiral path 32 on one face of the plate with a corresponding spiral path (not shown) formed on the opposite face of the plate (except those facing inlet 4 and outlet 6 in the end plates, since membranes are not provided for these faces), and progressing in the opposite direction, i.e., starting from the upper right corner, adjacent opening 33, and progressing counter-clockwise inwardly where it terminates in openings 34. Each plate 3 further includes a peripheral sealing ring 35.

Spiral ribs 31 and sealing rings 35 may be provided in any suitable manner. For example, they may be formed integrally with the separator plate, by moulding or cutting, or they may be formed of strips of rubber or other sealing material adhesively bonded to the respective faces of the plate.

The cell illustrated in FIGS. 1-3 operates as follows:

The feed solution is introduced through inlet 4 at a high pressure, e.g. about 10-100 atmospheres, and comes first into contact with the lower face (not shown) of the lowermost separator plate 3 in the stack. That face need not have the spiral path described above since there is no membrane exposed to that face. The feed solution passes through the center holes 34 in the lowermost separator plate 3 to the upper face (FIG. 3) of the separator plate, and then flows clockwise around spiral path 32 where it comes into contact with the lower face of the membrane (25, FIG. 2) of the overlying membrane support plate 2. During this flow of the feed solution spirally in contact with the lower face of membrane 25, permeate passes through the membrane and through channels 24 and holes 23 to the permeate outlet 8.

When the feed solution completes the spiral path on the upper face of the lower separator plate 3, it passes through the space between rod 6 and opening 22 in frame 2a of the membrane support plate 2 to the underside of the next separator plate 3 in the stack. Since opening 33 in that separator plate is of the same diameter as rod 6, the feed solution is forced to flow through the spiral path on the underside of that separator plate, the feed solution flowing counter-clockwise progressing from the outer periphery of the separator plate inwardly until it reaches the central openings 34 in that separator plate. During this flow of the feed solution, it comes into contact with the upper membrane 26 of that support plate 2, producing a permeate flowing through the membrane and passing via channels 24 and openings 23 to the permeate outlet 8.

In this manner, the feed solution flows along one spiral path first in contact with the lower membrane (e.g. 25) of the adjacent membrane support plate 2, and then in another spiral path in the opposite direction in contact with the upper membrane (e.g. 26) of the next adjacent membrane support plate, the feed solution passing serially from one membrane to the next until it exits through outlet 6 at the outlet side of the stack. At the same time, the permeate passing through the membranes flows through channels 24 and openings 23 in the membrane support plates to the permeate outlet 8.

Figure 4:
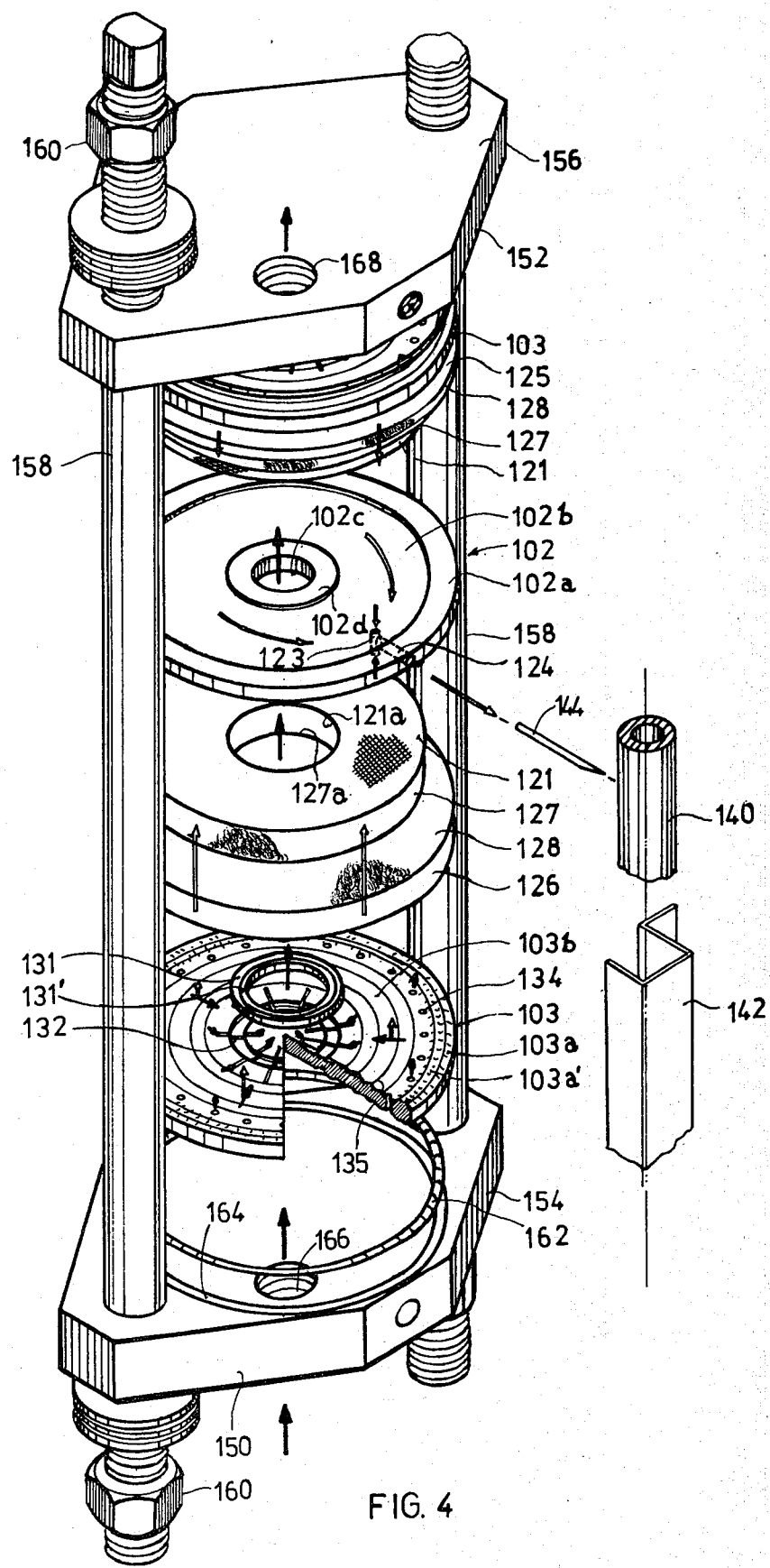
FIG. 4 is an exploded three-dimensional view illustrating a second form of cell constructed in accordance with the invention.

FIG. 4 illustrates another form of cell constructed in accordance with the invention. The stack in the cell of FIG. 4 comprises essentially the same elements as in the stack of FIGS. 1-3, namely a plurality of plates 102 supporting a membrane 125, 126 on each of its opposite faces defining the permeate compartments, and a plurality of separating plates 103 each interposed between the membranes of adjacent supporting plates 102 and defining the feed solution compartments. However, for the sake of simplicity, the exploded portion of the stack in FIG. 4 illustrates only one such membrane supporting plate 102 including the two membranes (125, 126) supported thereby, and only one separator plate 103.

As in the FIGS. 1-3 embodiment, the membrane supporting plates 102 are each formed with a thickened outer rim 102a enclosing a central recessed area 102b, except that the supporting plate 102 in FIG. 4 is of circular configuration, rather than of rectangular configuration as in FIGS. 1-3. Further, each of the supporting plates 102 in FIG. 4 is formed with a central opening 102c bordered by a thickened inner rim 102d. The center openings 102c of the supporting plates are in the circuit connecting the feed solution compartments in series through the stack. In addition, each supporting plate 102 is formed with an opening 123 through the central recess area 102b of the plate, and another opening 124 through the outer rim 102a of the plate, these openings defining passageways for conducting the permeate from the permeate compartments in parallel out of the stack.

Each of the separator plates 103 included in the stack is also of circular configuration and is of substantially the same diameter as the membrane supporting plates 102. Like the supporting plates 102, each of the separator plates 103 is also formed with a thickened outer rim 103a surrounding a central recessed area 103b. However, unlike the supporting plates 102, the separator plates 103 are non-apertured (i.e., they are not formed with central openings corresponding to openings 102c in the supporting plates 102); rather a circular ring insert 131 is provided at the center of each separator plate 103 on each of its opposite faces interposed between the center of the separator plate and the adjacent membrane for pressing same against the inner rim 102d of the supporting plate around its central aperture 102c. The ring insert 131 is provided with a pointed (which may be a rounded or a sharp one) circular edge 131' for securely and sealingly gripping the membrane between it and the inner rim 102d of the supporting plate 102. The thickened outer rim 103a of the separator plate 103 is similarly formed with a pointed circular edge, as shown at 103a', for securely and sealingly gripping the outer edge of the membrane between it and the outer rim 102a of the supporting plate 102. In addition, the central portion of the separator plate is formed with radially-extending ribs 132 underlying the rings 131 to provide communication for the feed solution between the central recessed area 103b of the separator plate and the interior of the ring.

Each of the separator plates 103 is further formed with a circular array of openings 134 just inwardly of the outer thickened rim 103a, these openings being in the series path of the feed solution. The feed solution flows in a thin film radially across the complete surface of the inner recessed area 103b of the separator plates 103, rather than in a spiral path as in the FIG. 103 embodiment. The central recessed area 103b of each separator plate 103, however, is formed with circular arrays of ribs or projections 135 of smaller thickness than that of the outer rim 103a, the purpose of ribs 135 being to impart turbulence to the feed solution as it flows in a radial direction across the respective face of the separator plate.

A screen 121, corresponding to screen 21 in FIGS. 1-3, is interposed between the central recessed area 102b and the respective membrane (e.g. 126) on each face of the supporting plates 102. In addition, two layers of porous sheet material 127, 128 (e.g., filter paper) are interposed between each screen 121 and the respective membrane. The porous paper sheets 127, 128 act as cushions for the respective membrane (e.g. 126) as it is pressed inwardly towards the recessed area 102b of the supporting plate 102 by the high pressure in the feed solution path; and the screens 121 permit the permeate passing through the membranes to reach the inner face of the supporting plates 102, from where the permeate is outletted via passageways 123, 124.

A tube 140 is supported alongside the stack in any suitable manner, preferably within a housing 142. Tube 140 is connected via tublets 144 to the outlets 124 of all the supporting plates 102 for receiving the permeate outletted in parallel from the permeate compartment.

The stack illustrated in FIG. 4 further includes a pair of end plates 150, 152 at its opposite ends having extensions 154, 156, projecting radially outwardly of the membranes 125, 126, supporting plates 102, and separator plates 103. The latter members are clamped between the end plates 150, 152, by a pair of rods 158 passing through the extensions 156 of the end plates so as to be outwardly of the membranes, their supporting plates and separator plates. The end plates 150, 152 are drawn together to clamp the latter elements by nuts 160 received on the threaded ends of the rods 158. In addition, the inner faces of the end plates 150, 156 are formed with circular recesses, as shown by recess 164 in plate 150, which recesses receive O-rings 162 of a diameter equal to that of the thickened ribs 103a of the separator plates 103. Further, end plate 150 is formed with a central opening 166 serving as the inlet for the feed solution, and end plate 152 is formed with another opening 168 serving as the outlet for the feed solution.

The cell illustrated in FIG. 4 operates in substantially the same manner as in FIGS. 1-3. Thus, the feed solution is inletted under high pressure via opening 166 in end plate 150 of the stack to the underface of the end separator plate 103, and passes through the circular array of openings 134 to the upper face of that plate. The feed solution then flows inwardly over the complete face of separator plate 103 in the form of a thin layer between that face and the under-face of the adjacent membrane 126, this flow of the feed solution being subjected to some turbulence by the circular ribs 135. At the inner region of the separate plate 103, the feed solution flows through the recesses 132 underlying the circular ring 131 to the region centrally of the ring, and then passes through the central openings (e.g. 127a) of the two porous paper sheet layers 127, 128, through the central opening 121a in the screen 121, through the central opening 102c in the adjacent membrane supporting plate 102, and through the central openings in the screen, the two layers of porous paper and membrane 125 at the opposite (upper) face of the supporting plate 102, to the underface of the next separator plate 103. The feed solution then flows radially outwardly through the recesses (132) underlying the ring (131) in that face of the separator plate to the circular array of openings (134) at the outer end of the central recessed area of the underface of that separator plate. From there, it flows radially inwardly along the upper face of the separator plate as described above.

It will thus be seen that the feed solution flows from one feed solution compartment (defined by a membrane and the respective face of the separator plate 103) to the next feed solution compartment in a serial manner through the stack from the feed solution inlet 166 to the feed solution outlet 168. It will also be seen that the permeate which passes through the membranes (125, 126) into the respective permeate compartments (defined by the membrane and the recessed area 102b of the respective supporting plate 102), flows in a parallel manner from the passages 124 in the respective supporting plates 102 to the permeate outlet tube 140.

The foregoing features in the embodiment illustrated in FIG. 4 enable a miniaturized construction to be made having low volume and weight (e.g. 2 Kg and less), having a relatively high membrane area (approximately 2,000 cm$^2$), having high recovery (approximately 90%), and requiring low energy consumption enabling operation by portable batteries.

Figure 5:
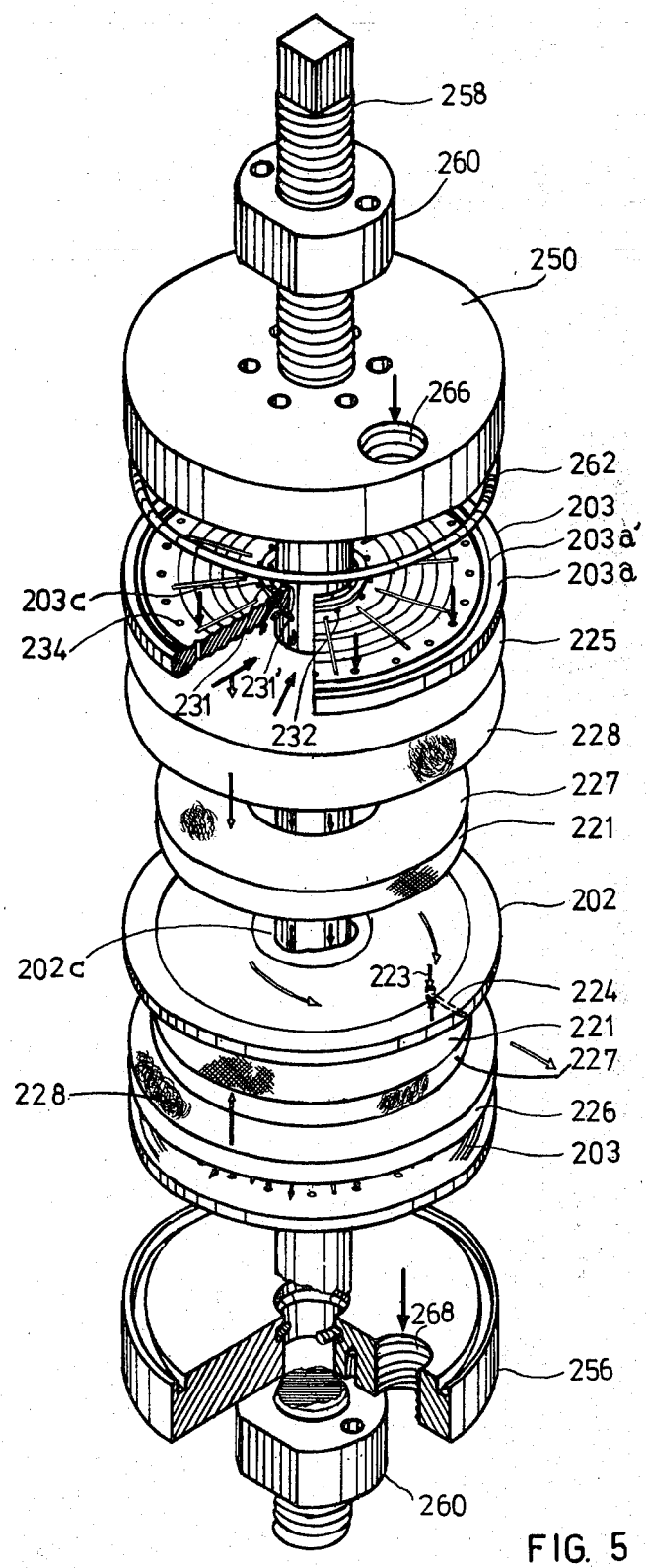
FIG. 5 is an exploded three-dimensional view illustrating a third form of cell constructed in accordance with the invention.

FIG. 5 illustrates a further embodiment of the invention similar to that of FIG. 4, including a stack of supporting plates 202 for supporting a membrane 225, 226 on each of its opposite faces, a plurality of separator plates 203, and a pair of end plates 250 and 256, as in the corresponding elements illustrated in FIG. 4. In FIG. 5, however, the elements are clamped in a stack by a rod 258 passing centrally through all the elements and receiving nuts at its opposite ends. As in the FIG. 4 embodiment, a screen 221, and two layers of porous paper 227, 228, are interposed between each face of the supporting plate 202 and the respective membrane (e.g. 225).

The membrane supporting plates 202 are essentially of the same construction as plates 102 in FIG. 4, except that the central opening 202c in the supporting plate is provided with a clearance for the passage of the feed solution between it and the central clamping rod 258. The separator plates 203 in the stack of FIG. 5 are also essentially of the same construction as plates 103 in FIG. 4, except that separator plates 203 are formed with a central opening 203c through which the center clamping rod 258, providing a tight fit therewith. In addition, instead of providing the rings (131) on the opposite faces of the separator plates 302, the latter are formed with a thickened inner rib 231 surrounding its center opening 203c. Further, instead of the recesses 132 for conducting the feed solution to or from the central area of the respective face of the separator plate 203, a circular array of channels 232 are provided through the separator plates leading from the outer edges of the thickened inner rim 231 to their inner edges. The separator plates 203 are also formed with the outer circular array of openings 234 at the inner side of the thickened outer rim 203a, as in FIG. 4.

Both the thickened inner rim 231 and thickened outer rim 203a of the separator plates are formed with pointed circular edges, as shown at 231' and 203a', respectively, for securely and sealingly gripping the inner and outer edges of the membrane between these separator plate rims and the corresponding rims of the adjacent supporting plate 202.

The cell illustrated in FIG. 5 is otherwise of the same construction as described above with respect to FIG. 4 and operates in the same manner. Thus, the feed solution inletted through opening 266 passes to the outer end of the upper face of the first separator plate 203 in the stack (inlet opening 266 being eccentric as illustrated in FIG. 5), and then passes through the outer circular array of openings 234 to the underface of the separator plate 203, whereupon the feed solution flows radially inwardly across the underface of the first separator plate 203 in contact with the adjacent membrane 225. At the inner region of the separator plate 203, the feed solution passes through the inner circular array of channels 231, through the clearance between the center opening in the membrane supporting plate 202 and through similar clearances provided in the two porous paper layers 228, 227 and screen 221 between the membrane and the respective faces of the membrane (225) and supporting plate 202. The feed solution then flows to the next feed solution compartment defined by the next membrane 226 and the upper face of the adjacent separator plate 202, whereupon the feed solution flows radially outwardly through that compartment. Thus, the feed solution flows through all the feed solution compartments in a serial manner as described above with respect to FIG. 4.

The permeate passing through the membranes and the respective supporting plates 203 are outletted in a parallel fashion through the passageways 223, 224 in the supporting plates 202, as in FIG. 4.

An advantage present in the cell illustrated in FIG. 4 over that of FIG. 5 is that the meintenance and membrane change is extremely simple in the FIG. 4 embodiment. Thus, all that is necessary is to loosen the tightening nuts 160, remove the membrane in question without disassembling the complete stack, insert a new membrand, and retighten the nuts.

Figure 6:
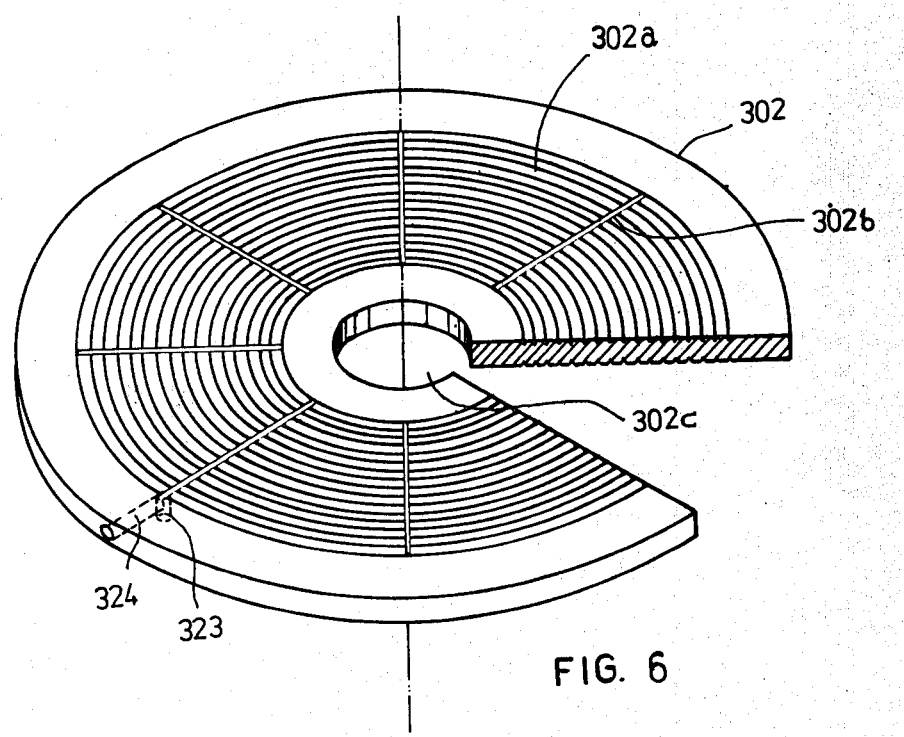
FIG. 6 is a three-dimensional view, partly broken away, illustrating a modified membrane supporting plate that may be used in the cells of FIGS. 4 and 5.

FIG. 6 illustrates a variation in the membrane supporting plate, therein designated 302, which may be used instead of membrane supporting plate 102 in FIG. 4 or 202 in FIG. 5. As shown in FIG. 6, the central area 302a of the supporting plate is formed with circular ribs which are connected together by radially-extending recesses 302b, conducting the permeate passing through the respective membranes to the outlet channels 323 and 324. Such a construction of membrane supporting plate enables the screens (121 or 221) and one of the porous paper sheets (e.g., 127 or 227), to be omitted from each face of the supporting plates, it being desirable to include one porous paper sheet (e.g., corresponding to sheet 128 or 228) at each face to provide a cushion for the membrane as it is pressed against the central area 302a of the supporting plate by the high pressure in the feed solution path.

As the cells described above can be operated at both low and high pressures, they may be used for microfiltration, ultrafiltration and hyperfiltration (reverse osmosis) applications. The above-described construction of these cells makes them eminently suitable for miniaturization. Thus, unlike conventional membrane cells, they can be operated at low-volume slow rates (as relatively high linear velocities are introduced by the small feed channel-cross-section), high recoveries, and therefore they can use small pumps.

While the invention has been described with respect to several preferred embodiments, it will be appreciated that many other variations, modifications and applications of the invention may be made.

What is claimed is:

1. A membrane separation cell for separating a permeate from a feed solution, comprising: a stack including a plurality of supporting plates each supporting a membrane on each of its opposite faces and defining a permeate compartment between the membrane and the respective face of the supporting plate; and a plurality of separator plates each interposed between the membranes of adjacent supporting plates and defining a feed solution compartment between the separator plate and the respective membrane; said separator plates being formed with passageways therebetween connecting the feed solution compartments in series through the stack such that the feed solution flows through each feed solution compartment in an inward direction across one face of the separator plate and in an outward direction across the opposite face of the separator plate; the opposite faces of the separator plates being each formed with a thickened outer rim circumscribing a recessed area across which the feed solution flows as a thin layer in a radial direction in contact with the face of the adjacent membrane; said passageways through each separator plate including a peripheral array of openings formed therethrough just inwardly of said thickened outer rim;

each membrane supporting plate being apertured at its center and each separator plate being non-apertured at its center; said stack further including: a ring insert interposed between the center of each separator plate and the adjacent membrane for pressing same against the inner rim of the respective supporting plate around its central aperture; a pair of cover plates at the opposite ends of the stack and having extensions projecting radially outwardly of the membranes, supporting plates and separator plates; and a plurality of rods passing through the cover plates outwardly of the membranes, supporting plates and separator plates, for clamping them all together.

2. A cell according to claim 1, wherein said ring insert is formed with a sharp circular edge for securely and sealingly gripping the adjacent membrane between it and the inner rim of the supporting plate.

3. A cell according to claim 1, wherein each face of the separator plate is formed with radially extending recesses underlying the ring insert for conducting the feed solution theraround.

4. A cell according to claim 1, further including a tube extending externally of the stack and connected to the passageways through all the membrane supporting plates for outletting the permeate from the stack.

5. A cell according to claim 1, wherein each membrane supporting plate is formed on its opposite faces with a plurality of circular recesses for collecting the permeate passing through the respective membrane, and a plurality of radial recesses for conveying the collected permeate in a radial direction to the permeate outlet passageways through the outer rim of the supporting plate.

6. A cell according to claim 1, wherein the recessed central area of each separator plate is formed with projections of smaller thickness than that of the outer rim to impart a turbulence to the feed solution as it flows in a radial direction across the respective face of the separator plate.

7. A cell according to claim 1, wherein said membrane supporting plates are each formed with an outer rim, a central area impermeable transversely through the plate and with recesses on its opposite faces for the accumulation of the permeate, and at least one passageway through the outer rim communicating with the recesses on the opposite faces of the central area for conducting the permeate from the permeate compartments in parallel out of the stack.

* * * * *